(No Model.) 3 Sheets—Sheet 1.

G. W. FREEMAN.
BICYCLE.

No. 516,157. Patented Mar. 6, 1894.

Witnesses
James J. Cutler
B. P. Barker

Inventor
George William Freeman
By Thomas W. Holiday
Attorney (No Model.) 3 Sheets—Sheet 2.

G. W. FREEMAN.
BICYCLE.

No. 516,157. Patented Mar. 6, 1894.

Witnesses
James J. Cutler
Eusebius A. Kellogg

Inventor
George William Freeman
By Thomas W. Holiday
Attorney (No Model.)

G. W. FREEMAN.
BICYCLE.

No. 516,157.

3 Sheets—Sheet 3.

Patented Mar. 6, 1894.

Witnesses
James J. Cutler.
Eusebius A. Kellogg

Inventor
George William Freeman.
By Thomas W. Wolsey
Attorney

UNITED STATES PATENT OFFICE.

GEORGE WILLIAM FREEMAN, OF SALEM, MASSACHUSETTS.

BICYCLE.

SPECIFICATION forming part of Letters Patent No. 516,157, dated March 6, 1894.

Application filed August 4, 1893. Serial No. 482,377. (No model.)

*To all whom it may concern:*

Be it known that I, GEORGE WILLIAM FREEMAN, of Salem, in the county of Essex, State of Massachusetts, have invented certain new and useful Improvements in Bicycles, of which the following is a specification.

The essence of this invention is in the way and manner the bicycle driving road wheel receives its rotary impelling movement, and in a flexible bicycle frame and efficient brake, substantially as hereinafter described and illustrated in the accompanying drawings.

The object of this invention is to attain a greater speed of a bicycle with less exertion, and also attain an efficient brake without injury to the wheel tire or rim, and a more comfortable riding machine.

Figure 1:
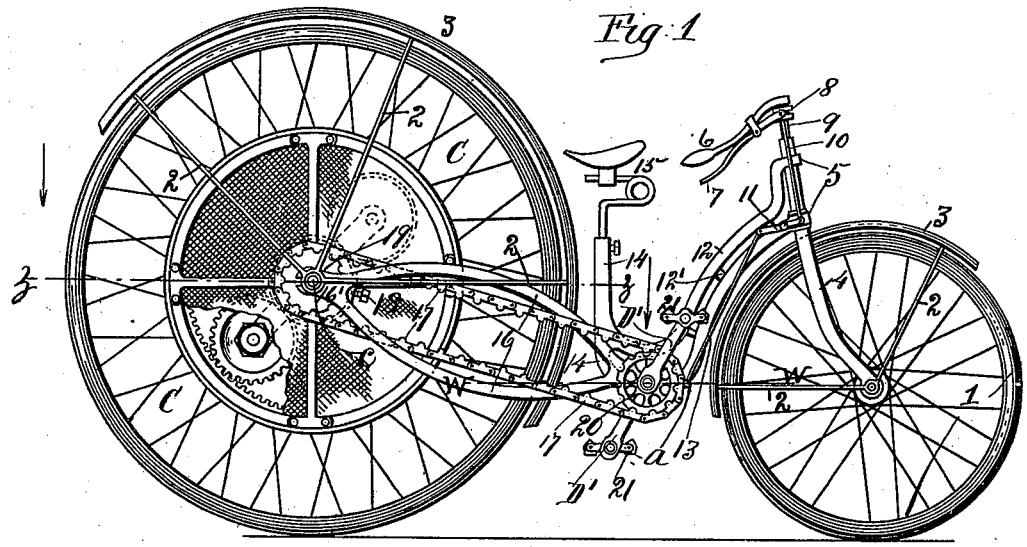
Figure 2:
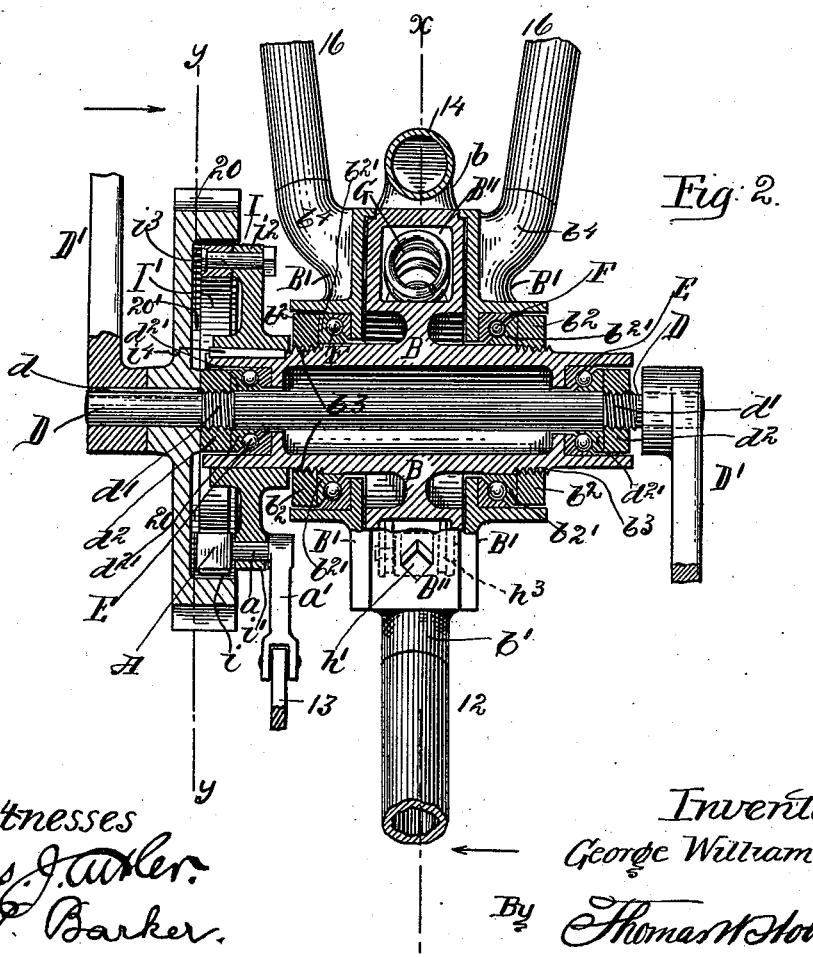
Figure 3:
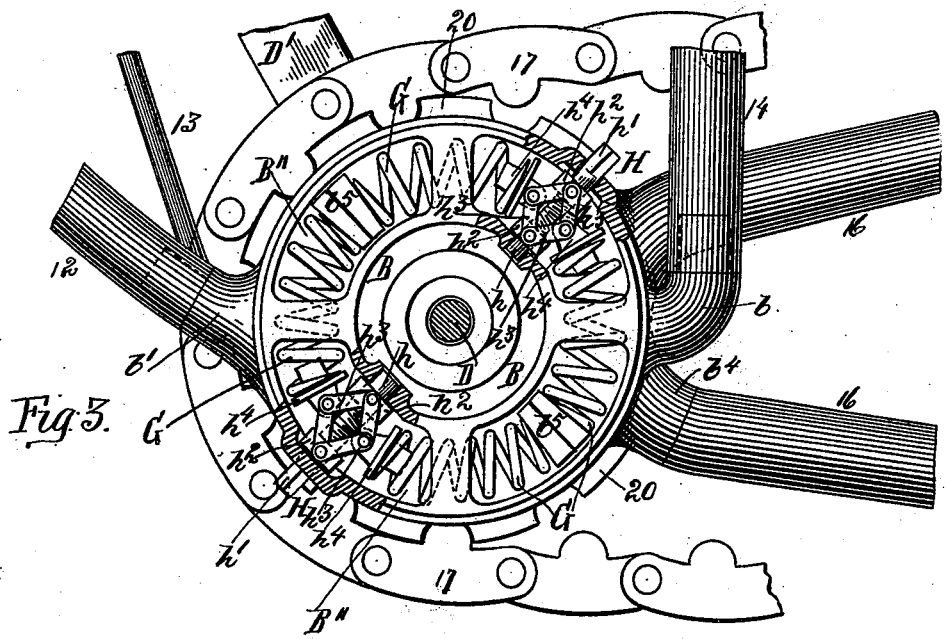
Figure 4:
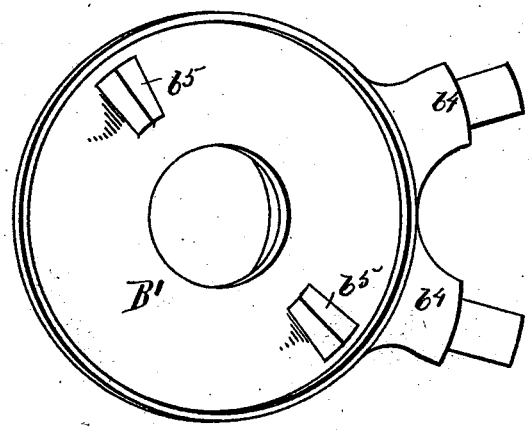
Figure 6:
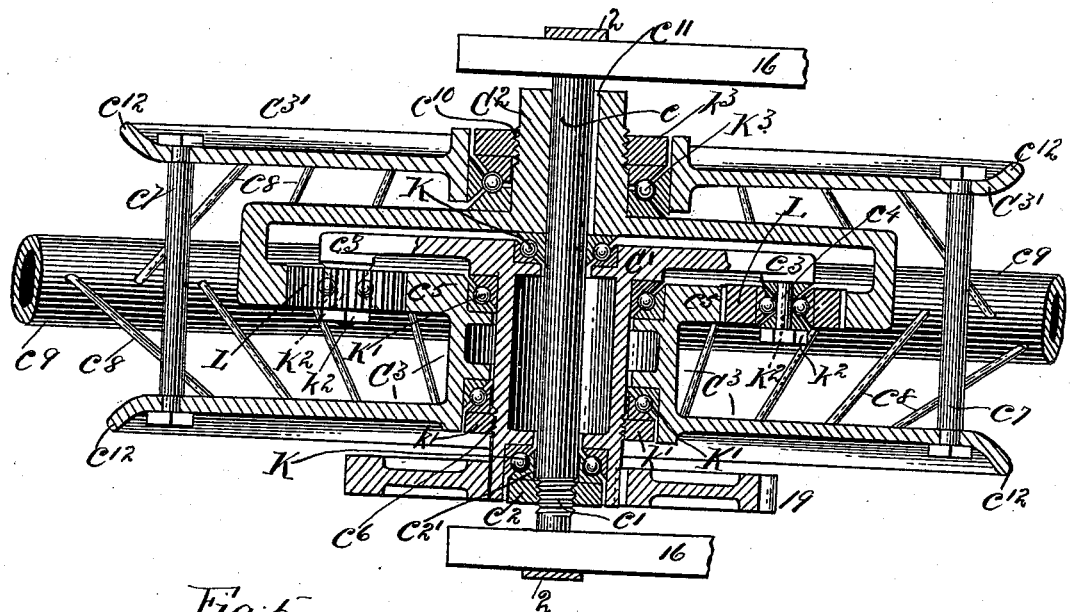
Figure 5:
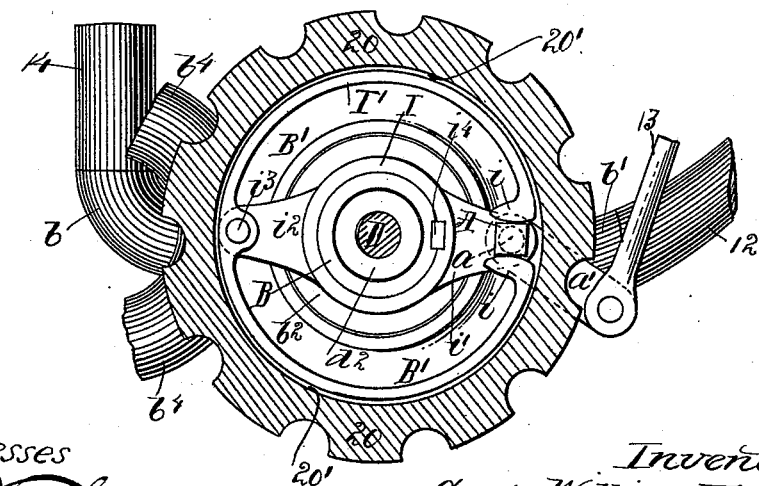

In the drawings Figure 1 represents a side view of a bicycle illustrating the features of this invention, more clearly shown in detail through the following views. Fig. 2, is a plan transverse detail section taken on line (w w) of Fig. 1. Fig. 3, is a detail sectional view taken on line x., x., of Fig. 2. Fig. 4, is a detail perspective view of the frame portion caps of the frame spring joint illustrated by the view Fig. 2, above mentioned. Fig. 5, is a sectional view taken on line y., y., of Fig. 2, and Fig. 6, is a cross section taken on line z., z., of Fig. 1.

(1) represents the front or driven bicycle road wheel, (2) the mud guard arms, and (3) the mud guard.

(4) denotes the bicycle frame fork, (5) its bearings for it to swing in and (6) the handle bar.

(7) represents the hand brake lever fulcrumed in the usual manner to the handle bar. This lever has one end forked with suitable engaging points that engage the annular groove freely in the collar (8) freely fitted to the telescoping rod (9) of the handle bar.

(10) denotes a connecting rod that connects the above collar and one arm of the lever (11) which is fulcrumed to the frame portion (12). The other arm of said lever is pivotally connected to the connecting rod (13) which has its opposite end connected to the lever (a). All of these brake lever connections are pivotal connections with the exception of the connection of the connecting rod (10) with the collar (8) which is a fixed connection but may be a pivotal connection if desired.

(14) represents the saddle post of the frame portion (12), and (15) the saddle and saddle spring post adjustably fitted to above mentioned saddle post in the usual manner.

Fig. 1 illustrates the frame portion (12) as being in two parts, the upper one curving from the fork and blending into the saddle post which has a branch secured to the trunnion (b) of the spring case hollow shaft (B); and the other part as curving from the said fork with its lower end secured to the trunnion (b') on the opposite side of aforesaid hollow shaft; also these two parts aforesaid as being rigidly combined by intermediate parts (12'). This form of construction of the frame portion (12) is optional as the above mentioned two curving parts can be substituted by one curving part provided with suitable fork bearings at one end and the other end rigidly secured to the spring case hollow shaft (B) while the opposite side of said hollow shaft can have secured thereto the saddle post proper, thus I do not wish to limit myself to this frame portion (12) constructed as illustrated in Fig. 1, but desire to have the freedom of securing any suitable means to the respective trunnions (b) and (b') of my flexible frame mechanism or means, clearly illustrated in several of the views of the drawings, to act and attain the end sought through the aforesaid frame portion (12).

(16) represents the other bicycle frame portions which connect the spring case hollow shaft collars (B') and the axial shaft (c) of my bicycle driving road wheel (C). This connection of the frame portion with the above mentioned shaft is in the ordinary manner to take up the slack of the wheel engaging chain (17) as denoted by the forked end (16') and take-up screw (18) therein.

(19) and (20) denote the chain engaging wheels of which the former will be dealt with later on. The latter is secured to the crank shaft (D) to which are also secured the crank arms (D').

(d) represents a key that locks both the chain wheel and the adjacent crank arm, to the crank shaft which has near its ends a threaded portion (d') to engage the threaded nuts ($d^2$). These nuts as with the nuts ($b^2$) that will be presently described have ball bushings ($d^{2\prime}$) and ($b^{2\prime}$) respectively secured thereto in a separable manner, the object of which is to save the nuts from being destroyed through the action of the balls of the respective ball bearings (E) and (F) which would occur if said nuts were not provided with aforesaid bushings or ball engaging portions. The other parts (B) and (B') are bushed in a similar manner as with the nuts. This is for the same reason as above mentioned with regard to the nuts. The spring case hollow shaft (B) surrounds the crank shaft between the chain driving wheel and the crank arm secured to the opposite end of said shaft, and effects the bearings (E) for said shaft to rotate on or in. This hollow shaft as before mentioned has the trunnions ($b$) and ($b'$) provided thereon which are designed as with said hollow shaft to effect respectively an efficent saddle post connection, a fork engaging frame connection, and a crank shaft bearing and other features which will presently appear. The above mentioned nuts ($b^2$) engage the threaded portions ($b^3$) on the periphery of the aforesaid hollow shaft, and can be provided with any ordinary means capable of preventing their moving after being adjusted to make satisfactory the bearings (F). The same can be done with the nuts ($d^2$) which is quite necessary as is known to those skilled in the art. The collars (B') cover the vertical sides of the spring case (B'') of the hollow shaft aforesaid and receive the above mentioned ball bearings (F) on the hollow shaft, which said bearings are optional in construction as with the other ball bearings illustrated throughout the accompanying drawings. These collars (B') have trunnions ($b^4$) and spring contact portions or walls ($b^5$). To these trunnions are secured the frame portions (16) above mentioned, and with the walls ($b^5$) contact the springs (G) that are incased within the case (B'') of the hollow shaft aforesaid. These springs are arranged, as more clearly illustrated by the view Fig. 3., each side of the walls ($b^5$) of the collars (B') and engage the spring engaging portions ($h^4$) of the spring compressing devices (H) designed to increase the power of the springs. These devices consist of a threaded shaft ($h$) having right and left threads and a square key head ($h'$) extending from the outer surface of the spring case of the hollow shaft that is provided with suitable bearings for said shaft as illustrated in Fig. 3.

($h^2$) represents nuts that respectively engage the threaded shaft aforesaid, and ($h^3$) denotes levers which are pivotally connected to the above mentioned spring engaging portions ($h^4$) and to the traveling nuts aforesaid in such a manner as to form toggle joints as illustrated by aforesaid view. Thus by turning the screw shaft in a rotary direction the nuts will either draw nearer to each other or go farther apart according to the rotary direction of said shaft, hence the spring engaging portions will either increase or diminish the force of the springs through the levers ($h^3$) connecting such and the nuts. The spring engaging walls ($b^5$) of the collars are oppositely located thereon see Fig. 4., and so arranged that they engage each other as illustrated clearly by the view Fig. 3 in which the walls ($b^5$) cross-hatched represent the walls belonging to the collar removed as represented by the aforesaid view. This is to make the movement of the opposite collars or caps on the hollow shaft equal, and to equalize the spring force and strain created, through the association of the devices just described and through the occupation of the bicycle saddle. The nuts ($d^2$) and ($b^2$) previously described further act as collars to prevent a lateral movement of the hollow shaft and the crank shaft and of the frame portion hollow shaft engaging collars or caps, just described.

(21) represents the pedals which are retained in the usual manner by the crank arms.

Having described my flexible bicycle frame I will now relate my brake mechanism, and bicycle driving road wheel mechanism. To the hollow shaft which as seen does not revolve, I secure rigidly the armed portion (I) which I term the spring brake retaining member. (I') represents a circular spring which has one side open and the ends ($i$) effecting said opening so designed as to form suitable surfaces for the cam (A) to engage. This cam has a shank or shaft ($a$) that receives a bearing on the arm ($i'$) of the retaining member (I) as shown by Fig. 2. To this cam shank is secured the arm ($a'$) that engages the connecting rod (13) before described. The opposite side of this spring from that which has the opening, is suitably held by the arm ($i^2$) of the before mentioned retaining member through the connecting bolt ($i^3$). This spring is located so as to contact the inner surface of the driving chain wheel, which is so designed as to permit said spring to enter as represented by the numeral (20').

Figs. 2, and 5, represent the spring out of contact with the chain wheel. Thus the brake is not applied but by causing the hand part of the brake lever (7) to approach the handle bar it will be readily seen by following the movement of the respective brake levers that the arm ($a'$) will move upward and thus cause the cam (A) to further separate the ends ($i$) of the brake spring (I), and hence cause such spring to contact the chain wheel through having its opposite side held by the retaining member aforesaid, and effect a most efficient brake.

($i^4$) denotes a key that secures said retaining member on the hollow shaft.

As before mentioned the frame portions (16) connect the movable spring joint collars or caps (B') and the driving road wheel axial center-shaft ($c$). This shaft is a stationary shaft and is so made by suitably engaging the ends of the frame portion aforesaid. ($c'$) represents the threaded portion of said shaft which the nut ($c^2$) engages. This nut as with the nuts previously described is provided with a ball bushing ($c^{2\prime}$) which is also employed on the other nuts ($k'$), ($k^2$) and ($k^3$) and respectively on the parts ($C'$), ($C^2$), ($C^3$) and ($C^{3\prime}$) provided respectively with the ball bearings ($K$), ($K'$), ($K^2$) and ($K^3$), and which said bushings or ball engaging portions are represented by the close cross-hatching throughout the just mentioned ball bearings. For convenience I will mention that this matter has particular reference to the detail view Fig. 6.

The above mentioned part ($C'$) is my driving hollow shaft which as shown receives the bearings ($K$) before mentioned, on the stationary shaft in such a manner as to not have a lateral movement on said shaft, and also have its bearings readily adjusted through the manipulation of the before mentioned nut ($c^2$) which can be locked where adjusted as with the above mentioned nuts by any well known means used by those skilled in the art. This hollow rotary shaft ($C'$) has the chain wheel (19) secured thereto as illustrated, and is also provided with the arms ($c^3$) and the above mentioned bearings ($K^2$) for the outer rotary shaft ($C^3$) or tire shaft to rotate on.

To the arms ($c^3$) are axially supported the gears ($L$) which are provided with ball bearings ($K^2$).

($k^2$) represents a ball bearing take-up lock nut and ($c^4$) the axis of gear ($L$), which the aforesaid nut engages. Said axis or shaft is retained by the aforesaid arm ($c^4$).

($c^5$) denotes a gear which is concentrically secured to the tire hollow shaft ($C^3$) and which engages the oppositely located gears ($L$). This tire hollow shaft is further provided with the disks or arms ($C^{3\prime}$) which are represented by Fig. 1 to be arms having secured thereto a disk of suitable gauzy material but which is optional as regards the aforesaid portion ($C^{3\prime}$) so far as the same efficiently performs its function which will presently appear.

($k'$) represents the take up nut of bearing ($K'$) that engages the threaded portion ($c^6$) on the outer periphery of the hollow driving shaft ($C'$).

($C^2$) denotes an internal gear designed to be rigidly secured to the stationary shaft, and provided with the tire hollow shaft portion ($C^{3\prime}$) bearing ($K^3$), and to mesh with the oppositely located gears ($L$) axially carried by the arms ($c^8$) of the driving hollow shaft ($C'$). The aforesaid hollow tire shaft portion ($C^{3\prime}$) is so employed to rotate on the hub of the internal gear aforesaid opposite to the disk ($C^{3\prime}$) in the same rotary direction therewith as attained through the connecting bolts ($c^7$) so as to create a suitable hub for the spokes represented by ($c^8$) to concentrically connect the tire ($c^9$) and aforesaid hub.

($k^3$) denotes the ball bearing ($K^3$) nut which engages the threaded portion (10) on the hub of the internal gear to adjust the aforesaid bearing and to act as a collar to prevent a lateral movement of the hollow tire shaft hub portion which is provided with a V shaped ball bushing.

($c^{11}$) represents a key that locks the internal gear aforesaid to the stationary shaft.

($c^{12}$) denotes the flare of the hollow tire shaft disks which are so designed for convenience in engaging the tire spokes. The connecting bolts ($c^7$) have their ends shouldered as clearly shown by Fig. 6., for their nuts to bring the respective disks against said shoulders in a solid manner and thus attain a rigid association of the hollow tire shaft or hub parts.

Having particularly described the parts or construction of my bicycle driving road-wheel the following matter relates the peculiar action of the respective operating parts thereof. The wheel engaging chain (17) transmits the movement of the driving chain wheel (20) to the driven chain wheel (19) secured to the driving hollow shaft of my bicycle driving road-wheel. Upon this driving hollow shaft receiving a rotary movement, the gears ($L$) carried by said shaft in mesh with the stationary internal gear secured to the stationary shaft, and with the hollow tire shaft gear, not only travel around the stationary shaft, but receive a planetary movement while so traveling around the stationary shaft through being in mesh with aforesaid stationary internal gear, thus such gears receiving such an action, it will be readily seen impart their movement to the hollow tire shaft gear and consequently to the tire or road portion of said wheel, which is caused to revolve several times to once of the hollow driving shaft around a common center.

Having now described my invention, I claim—

1. In a bicycle, the combination with the crank-shaft, the road-wheels, and mechanical devices operatively engaged therewith to actuate said wheels, of a bicycle frame mechanism having its wheel connecting fork holding portion and the saddle post secured to a suitable spring containing and crank-shaft bearing case, and the hind wheel connecting portion secured to suitable collars or caps, suitably mounted on aforesaid case, each side of the spring containing portion, the case provided with suitable crank shaft bearings, and with bearings for the collars or caps, spring pressure adjusting devices operatively on said spring containing portion, suitable spring contacting surfaces on the collars or caps, springs, contacting said surfaces and pressure adjusting devices, substantially as, and for the purpose described.

2. In the spring controlled pivotal joint of the frame, substantially as described, the combination with the frame connecting collars or caps, the spring containing and crank shaft bearing case, and the said case springs, of a spring pressure adjusting mechanism consisting of a shaft receiving suitable bearings on aforesaid case, having right and left threaded portions, traveling nuts engaging such portions, levers connecting said nuts and oppositely located spring engaging portions, and said threaded shaft having a key engaging head protruding from the surface of the aforesaid spring case of the crank shaft bearing case, substantially as and for the purpose described.

3. In the spring controlled pivotal joint of the frame, substantially as described, the combination with the spring containing and crank shaft bearing case, said case springs, and spring pressure adjusting devices, the crank shaft, having suitable bearings in aforesaid case, and having engaged therewith the nuts ($d^2$), the saddle post rigidly secured to said case and the fork holding frame portion also secured to said case, and such case provided with the ball bearings (F), of the caps or collars (B') engaging said bearings (F) and provided with the spring engaging trunnions ($b^5$) and the frame connecting tenons ($b^4$), the frame portion (16) being secured to aforesaid collar tenons and suitably engaging the axial shaft of the other of the bicycle wheels, substantially as and for the purpose described.

4. In a bicycle brake mechanism consisting of a spring brake holding portion (I) secured to the crank shaft bearing case of the bicycle frame, a circular spring having one side open and the opposite side suitably retained by the aforesaid retaining or hold portion, a suitable cam engaging both walls or ends of the opening in said spring, and having a shaft loosely passing through an arm of the above retaining portion (I), a lever secured to said cam shaft, and a rod pivotally connected to the opposite end of said cam shaft engaging lever, and said rod in operative engagement with other rods and lever suitably retained by the bicycle frame in such a manner as to operate said split spring brake while engaging the handle bar, and said spring brake being located within the driving chain wheel, and said wheel being so designed to receive within the same said spring brake, substantially as and for the purpose described.

5. In a bicycle driving road-wheel, the shaft (c) adjustably fitted in the respective ends of the bicycle frame and held by such frame from rotating, a hollow driving shaft receiving suitable bearings on aforesaid stationary shaft, said bearings being designed to prevent a lateral movement of said hollow driving shaft, a suitable chain engaging wheel secured to said hollow driving shaft in operative engagement with suitable driving devices, said hollow shaft having arms, gears axially supported by said arms on suitable bearings, an internal gear rigidly secured to aforesaid stationary shaft and in mesh with said axially retained driving hollow shaft gears, a hollow shaft receiving suitable bearings on aforesaid driving hollow shaft and having a gear in mesh with aforesaid driving hollow shaft gears and provided with suitable disks designed to form a suitable spoke engaging hub, said hollow hub shaft bearings being designed to prevent a lateral movement of said hollow spoke hub or shaft, spokes connecting said hub and the tire or rim of the wheel, and such tire portion of said wheel so receiving it impelling rotary movement, substantially as and for the purpose described.

In testimony whereof I have signed my name in the presence of two subscribing witnesses to this specification.

GEORGE WILLIAM FREEMAN.

Witnesses:
THOMAS W. HOBDAY,
STILLMAN J. GURNEY.